Aug. 19, 1924.
H. M. BROOKFIELD
1,505,537
MACHINE FOR FORMING GLASS ARTICLES
Filed June 6, 1917    2 Sheets-Sheet 1
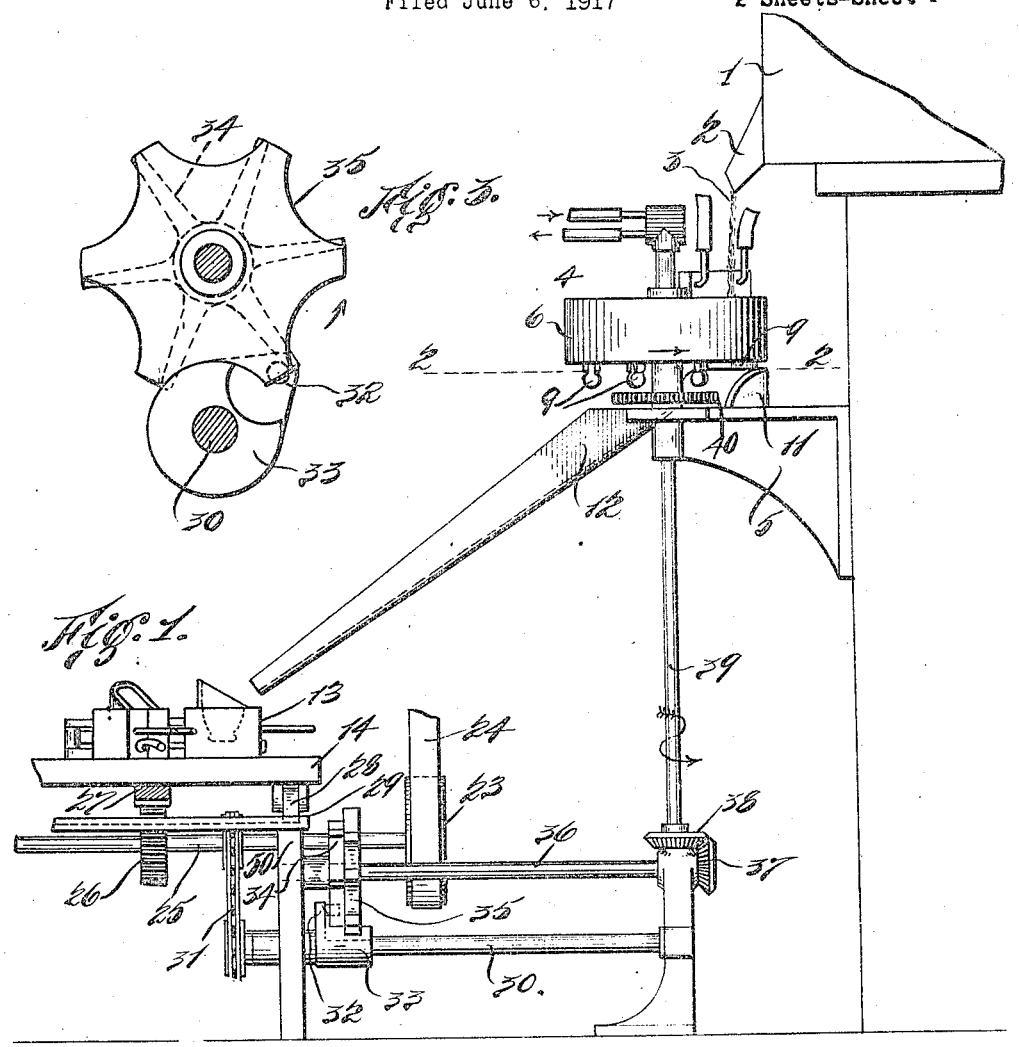

Aug. 19, 1924.
H. M. BROOKFIELD
MACHINE FOR FORMING GLASS ARTICLES
Filed June 6, 1917
1,505,537
2 Sheets-Sheet 2
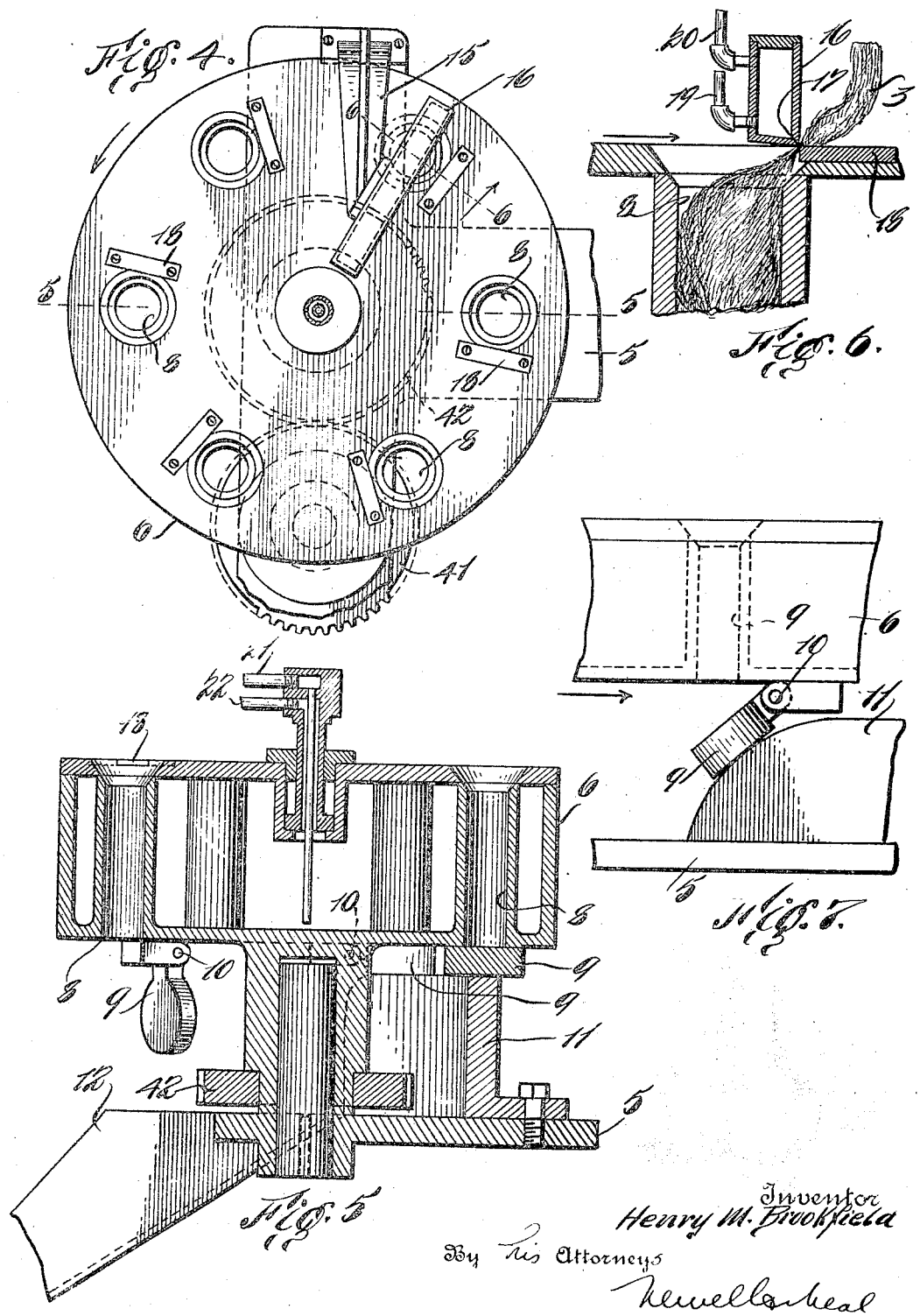

Patented Aug. 19, 1924.

1,505,537

UNITED STATES PATENT OFFICE.

HENRY M. BROOKFIELD, OF NEW YORK, N. Y., ASSIGNOR TO THE BROOKFIELD GLASS COMPANY, A CORPORATION OF NEW JERSEY.

MACHINE FOR FORMING GLASS ARTICLES.

Application filed June 6, 1917. Serial No. 173,090.

*To all whom it may concern:*

Be it known that I, HENRY M. BROOKFIELD, a citizen of the United States, residing at New York city, N. Y., have invented certain new and useful Improvements in Machines for Forming Glass Articles, of which the following is a clear, full, and exact description.

This invention relates to an improvement in machines for forming articles of glass, and is more particularly directed to an improved arrangement for gathering the glass as it emerges in a continuous molten stream from the glass furnace and in distributing the glass thus gathered in separated and properly measured masses to a series of molds wherein the articles are formed.

The object of the invention is to improve and simplify the construction of such a gathering and distributing mechanism, which I term a distributor, to render the operation of the same more rapid and accurate than devices of this kind heretofore constructed, to deliver the molten masses of glass to the pressing machine in better shape for being molded into articles and in general to improve the efficiency of automatic machines for making glass articles. The present improved distributor is preferably employed as an intermediate mechanism between a glass furnace, which supplies the molten glass in a continuous stream, and a molding or pressing machine, which receives the separated masses of glass for forming the same into the articles desired such for instance as glass insulators. The furnace and the pressing machine may be of any suitable character, the latter usually comprising a rotatable table with a series of molds, together with other appurtenances not necessary to be shown or described. Suitable driving mechanism can be employed for operating the rotating table of the pressing machine and the devices of the improved distributor, all in proper timed relation so that a separate and measured mass of glass will be delivered to each mold successively for the continued operation of said pressing machine in the forming of glass articles.

In my prior Patent #836,297 dated November 20, 1904, I have shown a device for transferring separated masses of glass from a furnace to a series of molds, and the present invention is distinguished therefrom, among other features, in that I now employ a turret-like table rotating on a vertical axis instead of a drum-like member rotating on a horizontal axis. In the present turret table which thus rotates horizontally may be arranged suitably circumscribed vertical openings for receiving the separated masses of glass in their upper ends and discharging the same from their lower ends with but slight distortion from their stream shape. This results in a more certain delivery of the glass masses into the pressing molds with less handling of the glass and consequently a better article and one of more homogeneous character may be formed.

Referring briefly to the drawings which represent my invention in its preferred form, Fig. 1 is a side elevation of the distributor showing at one side a portion of a glass furnace and at the other side a portion of a glass pressing machine;

Fig. 2 is a horizontal section through the distributor along line 2—2 of Fig. 1 and showing a portion of the pressing table in plan;

Fig. 3 is an enlarged detail of the Geneva gears forming part of the drive mechanism for the distributor;

Fig. 4 is an enlarged plan of the distributor;

Fig. 5 is a vertical section of the distributor through line 5—5 of Fig. 4;

Fig. 6 is a detail section showing the coaction between the severing scraper and the rim of a distributor opening; and Fig. 7 is an enlarged detail showing the action of the cam ridge upon a bottom cover of a distributor opening.

Referring more particularly to the drawings, a glass furnace is indicated at 1, having an outlet at 2, from which emerges a continuous stream of molten glass indicated at 3. The distributor mechanism indicated generally at 4, is suitably mounted adjacent to the furnace, as upon a bracket 5, and in my preferred embodiment comprises a hollow turret-like table 6 fixed to a vertical stub shaft 7, mounted in suitable bearings upon the bracket 5, so that the upper and lower surfaces of the table may rotate horizontally (see Fig. 5). Circumscribed openings 8 extend through said table 6 from the upper to the lower surface thereof preferably being of such contour and size as to confine the molten mass of glass received therein in a form suitable for slipping easily without substantial change of shape into the mold of the pressing machine into which it is afterwards delivered. The bottom of each opening 8 is adapted to be covered and uncovered by a separate bottom cover such as 9, pivoted adjacent its respective opening 8 on a pivot such as 10. Each bottom cover 9 is preferably weighted so as to automatically fall away from the lower end of its respective opening 8 and thus uncover the same when released, but at proper times said bottom covers 9 are carried up into closing position by a circular cam ridge such as 11 (see Fig. 7). The cam ridge 11 is fixed upon the bracket 5 beneath the turret table 6 and, as shown in Fig. 2, extends circumferentially part way around the path taken by the several bottom covers during the rotation of the table. The cam ridge rises so as to close the bottom covers before they come beneath the stream of glass 3 and said cam ridge ends abruptly in a position so as to permit the bottom covers to fall open as soon as they pass away from the stream of glass. Beneath this opening position of the mold openings 8 is a guide chute 12.

It will be understood that during the rotation of the table 6 the openings 8 will successively come beneath the stream of glass 3 and that the cam ridge 11 will close each bottom cover 9 so that its respective opening 8 will receive a charge of glass from the stream 3. As each opening 8 passes beyond the stream of glass 3, it comes to a position over a guide chute 12 into which its charge of glass is discharged upon the opening of the bottom cover. The chute 12 directs the charge of glass downwardly into a mold 13 of the mold table 14.

The stream of glass 3 is cut off from each mold opening 8 when the latter has received its measured charge, preferably by mechanism constructed as follows. Fixedly mounted on a stationary bracket 15 adjacent the rotating table 6 is a hollow scraper or severer 16, having a sharp edge 17 coacting with a ledge or plate 18 at the rim of the opening 8 (see Fig. 6). The coaction of edge 17 and plate 18 severs the stream of glass at the entrance to the opening 8 and said scraper 15 also pushes or scrapes the surplus glass from said opening over and into the next succeeding opening 8 during the movement of the table past the scraper. The hollow scraper 16 has its interior supplied with a cooling fluid such as water, air or steam, through inlet and outlet pipes 19 and 20, as shown. The hollow table 6 is also preferably supplied with a cooling fluid through inlet and outlet pipes 21 and 22. The reason for thus cooling the scraper 16 and the table 6 is that these parts are exposed to the initial contact with the molten glass issuing from the furnace, and if not cooled might soon become heated to such a high degree that the glass would stick thereto.

The driving means for rotating the distributing table 6 will now be described. In the present embodiment the turret table 6 is preferably rotated with an intermittent motion, coming to rest successively with each opening beneath the stream of glass 3. A mold table 14, as herein shown, is rotated continuously, although it is immaterial whether said table is moved continuously or intermittently so long as the parts are so timed as herein shown, to discharge a mass of separated glass through the chute 12 into each mold 13 as it comes beneath the lower end of the same. Preferably each distributor opening 8 is uncovered to discharge its mass of glass into the chute 12 upon the next stop in its rotation upon leaving the stream of glass 3. In this way the measured mass of glass is delivered to the chute 12 without unnecessary cooling and the openings 8 have the remaining part of the rotation to cool off. 23 indicates a drive pulley operated from belt 24 from any suitable source of power. Said pulley 23 is fixed to shaft 25, which has a gear 26 for engagement with a circular toothed rack 27 fixed to the bottom side of the mold table 14. Rollers 28 may also be carried on said mold table 14 to run in tracks 29 upon the stationary support 50 beneath the same. A counter-shaft 30 is operated from said shaft 25 through a suitable connection, as by sprocket and chain 31. The shaft 30 has fixed thereto an operating pin wheel 32 and lock wheel 33 of a Geneva drive mechanism. The star wheel 34 and lock sprocket 35 of said Geneva drive are fixed to a second counter-shaft 36 whereby said shaft 30, although rotating uniformly, will drive shaft 36 in an intermittent manner. Shaft 36 drives through bevelled gears 37, 38, a vertical shaft 39, the upper end of which has fixed thereto a gear 40, which through gear 41 drives gear 42 fixed upon the stub shaft 7 of the distributor table 6. It will thus be seen that the distributor table will be driven intermittently with a step-by-step motion and will be firmly locked by the Geneva drive mechanism in each of its stopped positions. Furthermore, the gearing connections to the mold table 14 are such that the latter will be rotated in proper timed relation to the distributor table 6.

Various changes in details may of course be made in the specific arrangement shown, and consequently I do not wish the claims to be limited to any particular embodiment of the invention, but to be interpreted in a sense consistent with the full scope of my improvement over the art.

What I claim is:—

1. In apparatus for forming articles of glass, the combination with means for feeding molten glass in a continuous unconfined stream, of a distributor for dividing said glass into separate masses to be subsequently delivered to molds, said distributor including a series of vertical openings having their bottoms normally closed, means for intermittently cutting off a piece of glass from said flowing stream sufficient to fill the opening immediately thereunder and sweeping the cut-off end into the following opening, and means for discharging the cut off piece of glass into a mold.

2. In apparatus for forming articles of glass, the combination with means for feeding molten glass in a continuous unconfined stream, of a distributor for dividing said glass into separate masses to be subsequently delivered to molds, said distributor including a horizontal movable table having a series of vertical openings therethrough, said openings having their bottoms normally closed, means for intermittently rotating said table to bring said openings successively into line with said stream of molten glass, means for cutting off a piece of glass from said flowing stream sufficient to fill the opening immediately thereunder and sweeping the cut off end into the following opening, and means for subsequently discharging the cut off piece of glass into a mold.

3. In apparatus for forming articles of glass, the combination with means for feeding molten glass in a continuous unconfined stream, of a distributor for dividing said glass into separate masses to be subsequently delivered to molds, said distributor including a horizontal movable table having a series of vertical openings therethrough, said openings having their bottoms normally closed, means for intermittently moving said table from a position in which one vertical opening is beneath a stream of molten glass to a position in which another opening is beneath said stream, and means rendered effective by the intermittent movement of said table for cutting off a piece of glass from said flowing stream sufficient to fill the opening immediately thereunder and sweeping the cut off end into the following opening.

4. In apparatus for forming articles of glass, in combination with means for feeding molten glass in a continuous unconfined stream, of a distributor for dividing said stream into separate masses to be subsequently delivered to molds, said distributor comprising a horizontally rotatable table provided with a series of vertically walled openings therethrough, means for intermittently rotating said table to bring said openings successively into line with said stream of molten glass, and a stationary shear member adjacent to the stream of glass and to the upper surface of the table and adapted to cooperate with the upper end of each opening to sever the stream of glass and carry it over the intervening table surface to the succeeding opening as the table makes its intermittent movement of rotation.

5. Apparatus for forming articles of glass comprising, in combination, means for feeding molten glass in a continuous unconfined stream, a distributor for separating said stream into measured masses, comprising a horizontally rotatable table having a series of vertical openings therethrough arranged to come successively beneath the stream of glass, a rotatable table carrying a series of molds into which said distributor is adapted to discharge the measured masses of glass, means for continuously rotating said mold table, means for intermittently rotating said distributor in timed relation to the movement of said mold table, stream cutting shears respectively adjacent to said stream and to each opening in said distributor, and means for cooling said distributor and said shears.

6. In an apparatus for forming articles of glass in combination, means for feeding molten glass in a continuous unconfined stream, a distributor for severing said stream into separated masses comprising a horizontally moving table with vertical openings therethrough adapted to come successively beneath said stream of glass, means adjacent to said stream and co-operating with said openings for severing the stream, a removable bottom for each opening adapted to uncover the same automatically, a cam for closing said bottoms at proper times for receiving the separated masses of glass therein and for allowing the same to fall open to discharge said glass masses, a movable mold table having a series of glass molds thereon for receiving the separated masses of glass discharged from said distributor, operating mechanism for continuously driving said mold table and intermittently driving distributor in proper timed relation, and a chute for guiding said glass masses from said distributor to said mold table.

Signed at New York, N. Y., this 2nd day of June, 1917.

HENRY M. BROOKFIELD.

Witnesses:
C. T. NEAL,
FRANK BROOKFIELD.